(12) United States Patent
Imanishi et al.

(10) Patent No.: US 10,573,908 B2
(45) Date of Patent: Feb. 25, 2020

(54) FUEL CELL SYSTEM AND VEHICLE EQUIPPED WITH FUEL CELL

(71) Applicant: TOYOTA JIDOSHA KABUSHIKI KAISHA, Toyota-shi, Aichi-ken (JP)

(72) Inventors: Hiroyuki Imanishi, Toyota (JP); Kazuo Yamamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/937,107

(22) Filed: Nov. 10, 2015

(65) Prior Publication Data

US 2016/0133962 A1 May 12, 2016

(30) Foreign Application Priority Data

Nov. 12, 2014 (JP) ................. 2014-229400

(51) Int. Cl.
*H01M 8/04* (2016.01)
*H01M 8/04089* (2016.01)
(Continued)

(52) U.S. Cl.
CPC ......... *H01M 8/04104* (2013.01); *B60L 50/72* (2019.02); *B60L 58/33* (2019.02);
(Continued)

(58) Field of Classification Search
CPC ......... H01M 8/04104; H01M 2250/20; H01M 8/04231; H01M 8/04388; H01M 8/04432; H01M 8/04559; H01M 8/04761; H01M 8/04783; H01M 2008/1095; H01M 8/04303; H01M 8/04228; H01M 8/04753; H01M 10/04104; Y02T 90/32; Y02T 90/16; Y02T 90/34; Y02T 10/7291; B60L 58/33; B60L 2240/662; B60L 50/72
(Continued)

(56) References Cited

U.S. PATENT DOCUMENTS

2003/0022041 A1* 1/2003 Barton ............... H01M 8/04231
429/432
2004/0229088 A1* 11/2004 Hayashi ............ H01M 8/04231
429/429
(Continued)

FOREIGN PATENT DOCUMENTS

EP 2 487 740 A1 8/2012
JP 2005-100820 4/2005
(Continued)

*Primary Examiner* — Jonathan G Jelsma
*Assistant Examiner* — Omar M Kekia
(74) *Attorney, Agent, or Firm* — Finnegan, Henderson, Farabow, Garrett & Dunner, LLP

(57) ABSTRACT

A fuel cell system used in a vehicle equipped with a fuel cell includes: a fuel cell; a fuel gas supply portion which supplies a fuel gas to the fuel cell; a fuel gas discharge portion which discharges exhaust fuel gas from the fuel cell; and a control unit, in which, when an operation of the fuel cell is ended, the control unit performs (a) an exhaust process of discharging the exhaust fuel gas of the fuel cell to reduce a pressure, and (b) a process of increasing a partial pressure of the fuel gas in the fuel cell by supplying the fuel gas to the fuel cell after the exhaust process.

9 Claims, 5 Drawing Sheets

(51) Int. Cl.
*H01M 8/0438* (2016.01)
*H01M 8/04746* (2016.01)
*H01M 8/04228* (2016.01)
*H01M 8/04223* (2016.01)
*H01M 8/04537* (2016.01)
*H01M 8/04303* (2016.01)
*B60L 58/33* (2019.01)
*B60L 50/72* (2019.01)

(52) U.S. Cl.
CPC .... *B60L 2240/662* (2013.01); *H01M 8/04228* (2016.02); *H01M 8/04231* (2013.01); *H01M 8/04303* (2016.02); *H01M 8/04388* (2013.01); *H01M 8/04432* (2013.01); *H01M 8/04559* (2013.01); *H01M 8/04753* (2013.01); *H01M 8/04761* (2013.01); *H01M 8/04783* (2013.01); *H01M 2250/20* (2013.01); *Y02T 10/7291* (2013.01); *Y02T 90/16* (2013.01); *Y02T 90/32* (2013.01); *Y02T 90/34* (2013.01)

(58) Field of Classification Search
USPC .......................................................... 429/446
See application file for complete search history.

(56) References Cited

U.S. PATENT DOCUMENTS

| | | | |
|---|---|---|---|
| 2009/0035630 A1* | 2/2009 | Kumada | H01M 8/04238 429/430 |
| 2010/0015482 A1 | 1/2010 | Kajiwara | |
| 2010/0266916 A1* | 10/2010 | Imanishi | H01M 8/04268 429/429 |
| 2011/0143243 A1* | 6/2011 | Arthur | H01M 8/04223 429/429 |
| 2013/0071767 A1* | 3/2013 | Katano | H01M 8/04097 429/444 |

FOREIGN PATENT DOCUMENTS

| | | |
|---|---|---|
| JP | 2008-108434 | 5/2008 |
| JP | 2008-243764 A | 10/2008 |
| JP | 2010-262805 | 11/2010 |
| JP | 2013-114992 | 6/2013 |
| JP | 2013-145709 | 7/2013 |
| JP | 2014-137887 A | 7/2014 |
| KR | 10-2010-0065208 A | 6/2010 |
| WO | WO 00/74162 A1 | 12/2000 |
| WO | WO2005/099016 A2 | 10/2005 |

\* cited by examiner

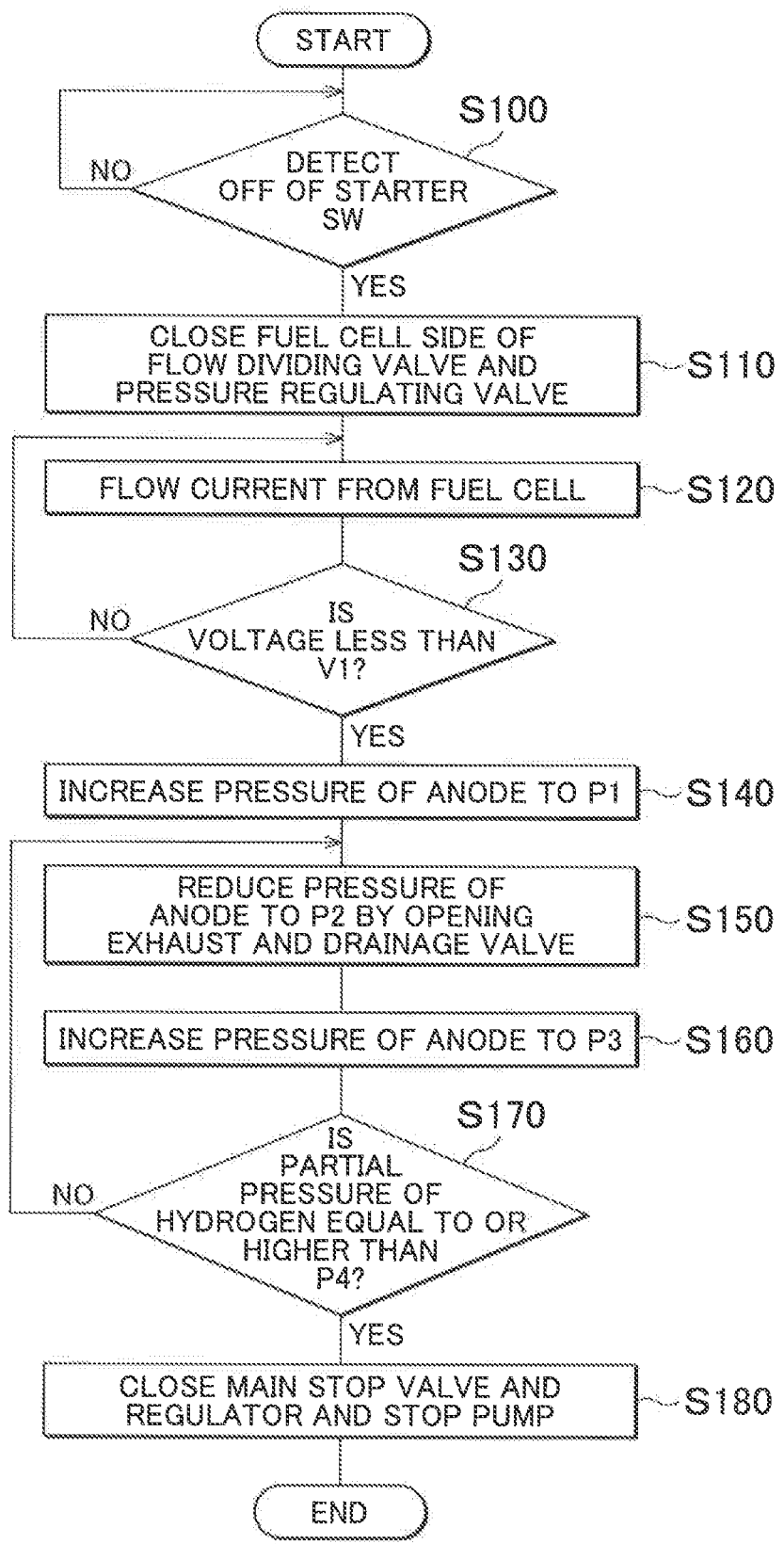

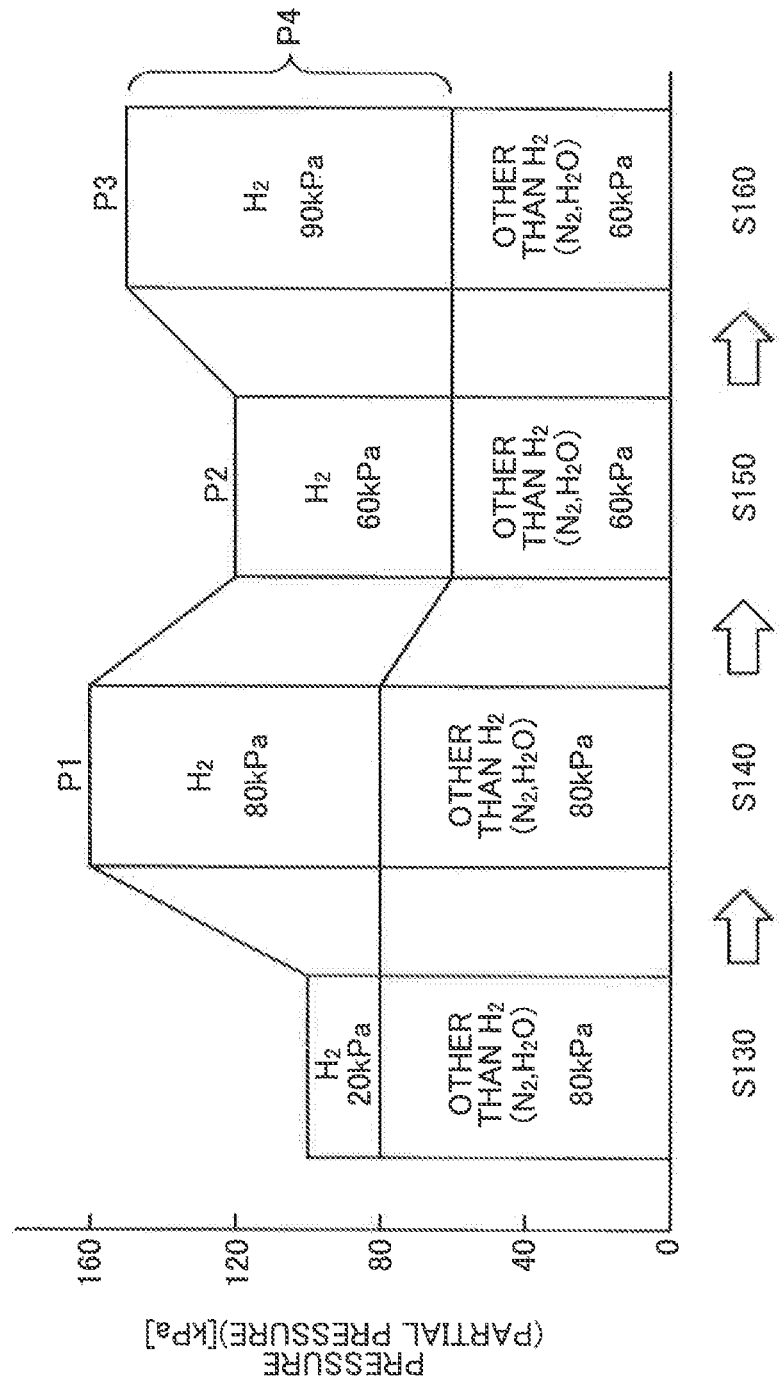

FUEL CELL SYSTEM AND VEHICLE EQUIPPED WITH FUEL CELL

INCORPORATION BY REFERENCE

The disclosure of Japanese Patent Application No. 2014-229400 filed on Nov. 12, 2014 including the specification, drawings and abstract is incorporated herein by reference in its entirety.

BACKGROUND OF THE INVENTION

1. Field of the Invention

The present invention relates to a fuel cell system and a vehicle equipped with a fuel cell.

2. Description of Related Art

In Japanese Patent Application Publication No. 2013-145709, a technique is described in which, when an operation of a fuel cell is stopped, an increase and a decrease in current output from the fuel cell are periodically repeated so as not to allow an oxidizing gas to remain in an internal section (cathode) of the fuel cell after the operation is stopped, such that the oxidizing gas is efficiently consumed. When the oxidizing gas is consumed, a flow dividing valve is fully turned to a bypass side, and a pressure regulating valve is fully opened.

Oxygen that is not consumed moves to an anode through an electrolyte film after the operation of the fuel cell is ended. On the other hand, since the anode contains impurities such as nitrogen moved from a cathode, there may be case where the partial pressure of hydrogen in the anode is low. In the case where the partial pressure of hydrogen is low, hydrogen and oxygen may react with each other in the anode and an electromotive force is generated in a surface of the anode electrode. In addition, the durability of a catalyst may be degraded. When hydrogen is supplied to the anode in order to increase the partial pressure of hydrogen, the amount of hydrogen penetrating the cathode is increased. Therefore, when the hydrogen in the cathode is discharged during a subsequent start-up, the concentration of hydrogen in emissions is increased. In addition, the total pressure of the anode is increased, and this is disadvantageous in terms of an injection pressure at which hydrogen is injected into the anode, or the pressure resistance of the anode.

SUMMARY OF THE INVENTION

According to an aspect of the present invention, there is provided a fuel cell system used in a vehicle equipped with a fuel cell. The fuel cell system includes: a fuel cell; a fuel gas supply portion which supplies a fuel gas to the fuel cell; a fuel gas discharge portion which discharges exhaust fuel gas from the fuel cell; and a control unit. When an operation of the fuel cell is ended, the control unit performs (a) an exhaust process of discharging the exhaust fuel gas of the fuel cell to reduce a pressure, and (b) a process of increasing a partial pressure of the fuel gas in the fuel cell by supplying the fuel gas to the fuel cell after the exhaust process. According to this aspect, the exhaust fuel gas containing impurities is discharged by discharging exhaust gas from the fuel cell, and thereafter the fuel gas is supplied. Therefore, the partial pressure of the impurities can be reduced and the partial pressure of the fuel gas can be increased without increasing the total pressure.

In the fuel cell system of this aspect, the control unit may calculate the partial pressure of the fuel gas in the fuel cell, and repeat the processes (a) and (b) until the partial pressure of the fuel gas becomes a predetermined partial pressure or higher. According to this aspect, the partial pressure of the fuel gas in the anode electrode can be increased to a predetermined partial pressure.

In the fuel cell system of this aspect, an internal pressure of the fuel cell after the process (a) is performed may be higher than an atmospheric pressure. For the internal pressure of the fuel cell after the process (a), time is needed. When time is needed, the partial pressure of the fuel gas in the fuel cell and the partial pressure of the fuel gas in the outside atmosphere become in equilibrium, which instead results in a reduction in the partial pressure of the fuel gas in the fuel cell. According to this aspect, the process (a) can be performed within a short period of time. Therefore, the fuel gas and the impurities can be discharged at the same ratio as the ratio between the partial pressures of the fuel gas and the impurities in the fuel cell.

The fuel cell system of this aspect may further include: an oxidizing gas supply portion which supplies an oxidizing gas to the fuel cell; an oxidizing gas discharge portion which discharges exhaust oxidizing gas of the fuel cell; a bypass pipe which does not supply the oxidizing gas to the fuel cell and discharges the oxidizing gas to the oxidizing gas discharge portion; a flow dividing valve for dividing the oxidizing gas to flow into the fuel cell and the bypass pipe; and a pressure regulating valve which is provided between a connection portion of the oxidizing gas discharge portion and the bypass pipe, and the fuel cell. The control unit may perform, before the process (a), (c) a process of closing the pressure regulating valve, and allowing the oxidizing gas not to be supplied to the fuel cell by using the flow dividing valve and allowing current to be drawn from the fuel cell, thereby consuming the oxidizing gas in the fuel cell. According to this aspect, the oxidizing gas of the cathode can be reduced, and thus the oxidation of the cathode side catalyst layer can also be suppressed. In addition, the amount of the oxidizing gas being diffused toward the anode electrode is small, and thus the generation of an electromotive force in an electrode surface of the anode electrode can be suppressed.

In the fuel cell system of this aspect, the control unit may perform the process (c) until a voltage of the fuel cell becomes less than a predetermined voltage. According to this aspect, the oxidation of the cathode side catalyst layer can also be suppressed. In addition, the amount of the oxidizing gas being diffused toward the anode electrode is small, and thus the generation of an electromotive force in an electrode surface of the anode electrode can be suppressed.

The fuel cell system of this aspect may further include: an oxidizing gas supply portion which supplies an oxidizing gas to the fuel cell; an oxidizing gas discharge portion which discharges exhaust oxidizing gas of the fuel cell; a bypass pipe which does not supply the oxidizing gas to the fuel cell and discharges the oxidizing gas to the oxidizing gas discharge portion; and a flow dividing valve for dividing the oxidizing gas to flow into the fuel cell and the bypass pipe. The fuel gas discharge portion and the oxidizing gas discharge portion may be connected to each other, and the control unit may control the flow dividing valve to allow all of the oxidizing gas to flow through the bypass pipe when the process (a) is performed, thereby allowing the discharged fuel gas to be diluted and discharged to the outside atmosphere. According to this aspect, the concentration of the fuel gas in the gas discharged when the process (a) is performed can be suppressed to be low.

In addition, the present invention can be realized in various forms. For example, the present invention can be realized in the form of a vehicle equipped with a fuel cell or the like in addition to the fuel cell system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a flowchart of a process after a starter switch of the vehicle 10 equipped with a fuel cell is turned off; and FIG. 5 is an explanatory view illustrating an example of changes in the total pressure and the partial pressure of hydrogen in the anode electrode.

DETAILED DESCRIPTION OF EMBODIMENTS

Figure 1:
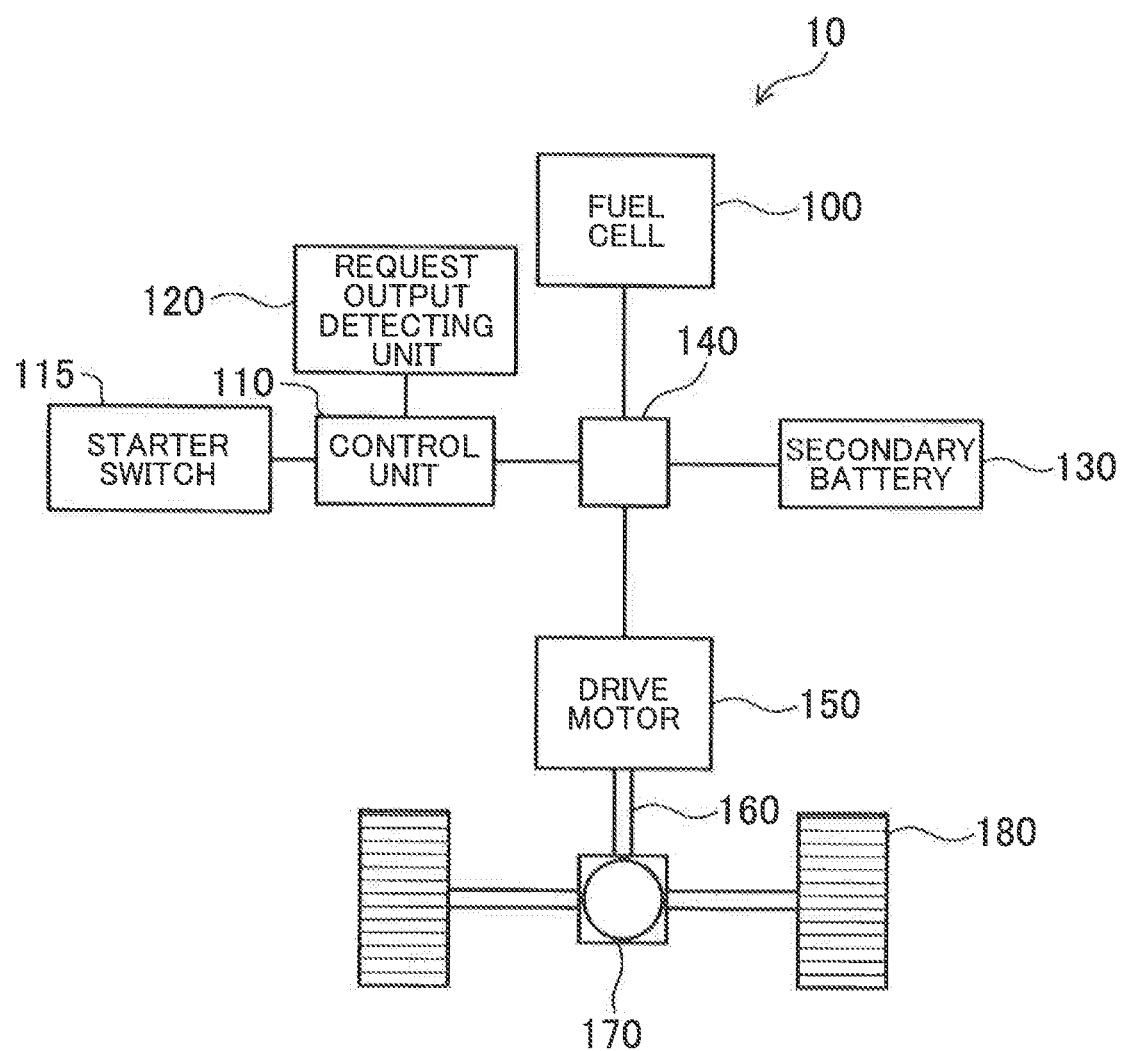
FIG. 1 is an explanatory view illustrating a vehicle in which a fuel cell is mounted.

FIG. 1 is an explanatory view illustrating a vehicle in which a fuel cell of an embodiment is mounted. A vehicle 10 equipped with a fuel cell includes a fuel cell 100, a control unit 110 (also called an electronic control unit (ECU)), a starter switch 115, a request output detecting unit 120, a secondary battery 130, a power distribution controller 140, a drive motor 150, a drive shaft 160, a power distribution gear 170, and wheels 180.

The fuel cell 100 is a power generation device which extracts power by allowing a fuel gas and an oxidizing gas to electrochemically react with each other. The control unit 110 controls the operations of the fuel cell 100 and the secondary battery 130 on the basis of a request output value acquired from the request output detecting unit 120. The request output detecting unit 120 detects a pressing amount of an accelerator (not illustrated) of the vehicle 10 equipped with a fuel cell, and detects a request output of a driver from the magnitude of the pressing amount. The control unit 110 calculates a request power amount required of the fuel cell 100 from the request output. The starter switch 115 is a main switch which switches between the start-up and stop of the vehicle 10 equipped with a fuel cell. The secondary battery 130 is used as a power source for operating the vehicle 10 equipped with a fuel cell in a case where the power generated by the fuel cell 100 is small, for example, immediately after the start-up of the vehicle 10 equipped with a fuel cell. As the secondary battery 130, for example, a nickel-hydrogen battery, or a lithium-ion battery may be employed. Charging the secondary battery 130 may be performed, for example, by directly charging the secondary battery 130 using power output from the fuel cell 100, or by charging the secondary battery 130 using the kinetic energy of the vehicle 10 equipped with a fuel cell regenerated by the drive motor 150 when the vehicle 10 equipped with a fuel cell is decelerated. The power distribution controller 140 controls the amount of power extracted from the fuel cell 100 to the drive motor 150 and the amount of power extracted from the secondary battery 130 to the drive motor 150 under a command from the control unit 110. In addition, the power distribution controller 140 sends power regenerated by the drive motor 150 to the secondary battery 130 under a command from the control unit 110 when the vehicle 10 equipped with a fuel cell is decelerated. The drive motor 150 functions as an electric motor for operating the vehicle 10 equipped with a fuel cell. In addition, the drive motor 150 functions as a generator for regenerating the kinetic energy of the vehicle 10 equipped with a fuel cell into electrical energy when the vehicle 10 equipped with a fuel cell is decelerated. The drive shaft 160 is a rotating shaft for transmitting the drive power generated by the drive motor 150 to the power distribution gear 170. The power distribution gear 170 distributes the drive power into the right and left wheels 180.

Figure 2:
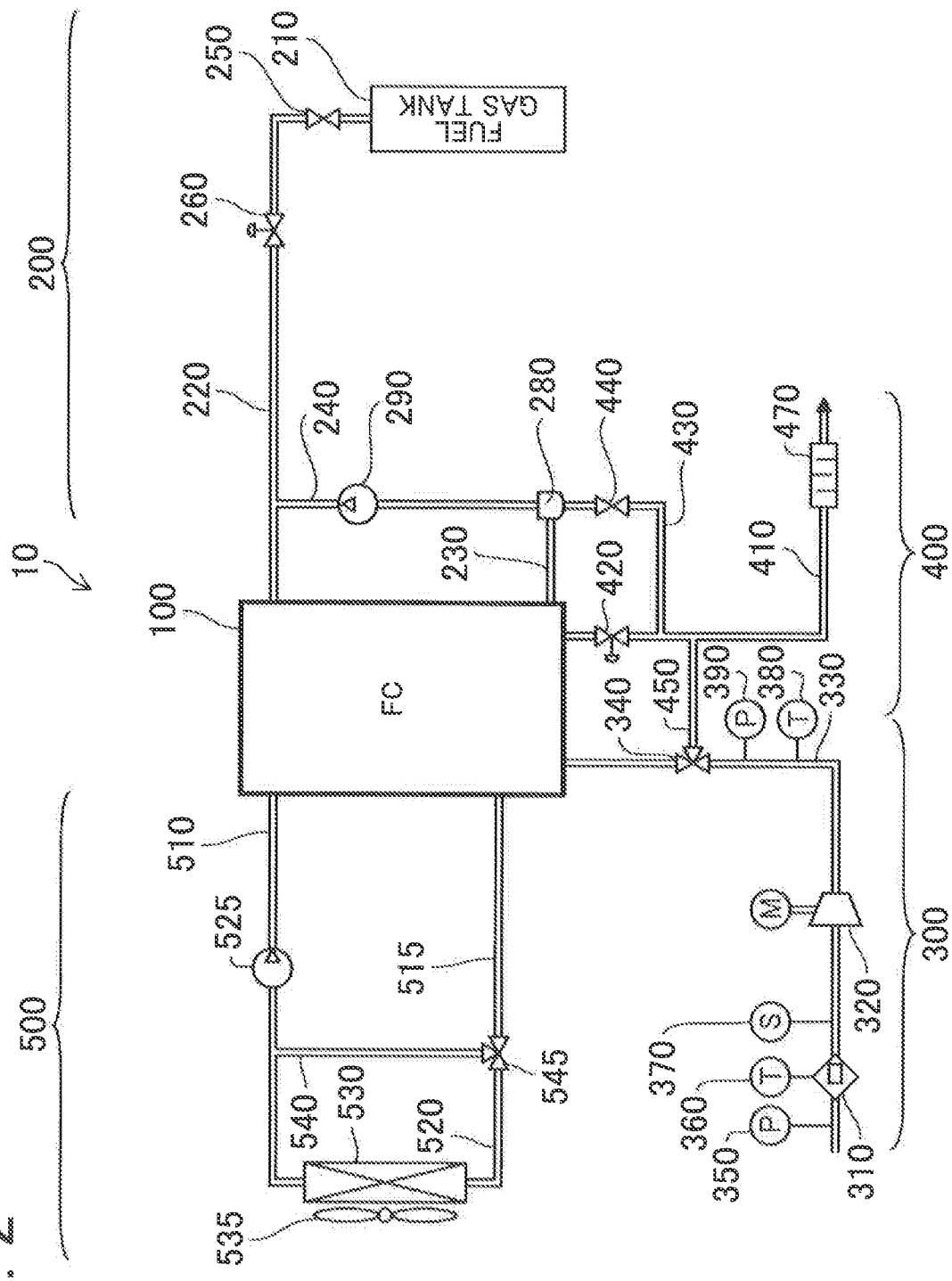
FIG. 2 is an explanatory view illustrating a fuel cell system of a vehicle 10 equipped with a fuel cell.

FIG. 2 is an explanatory view illustrating a fuel cell system of the vehicle 10 equipped with a fuel cell. The vehicle 10 equipped with a fuel cell includes the fuel cell 100, a fuel gas supply circuit 200, an oxidizing gas supply circuit 300, an exhaust gas circuit 400, and a cooling circuit 500.

The fuel gas supply circuit 200 includes a fuel gas tank 210, a fuel gas supply pipe 220, a fuel gas exhaust pipe 230, a fuel gas recirculation pipe 240, a main stop valve 250, a regulator 260, a vapor-liquid separator 280, and a hydrogen pump 290. The fuel gas tank 210 stores a fuel gas. In this embodiment, hydrogen is used as the fuel gas. The fuel gas tank 210 and the fuel cell 100 are connected by the fuel gas supply pipe 220. The fuel gas supply pipe 220 is an example of a fuel gas supply portion of the present invention. The main stop valve 250 and the regulator 260 are provided on the fuel gas supply pipe 220 from the fuel gas tank 210 side. The main stop valve 250 turns the supply of the fuel gas from the fuel gas tank 210 on and off. The regulator 260 is a pressure regulating portion which regulates the pressure of the fuel gas supplied to the fuel cell 100.

The fuel gas exhaust pipe 230 discharges exhaust fuel gas from the fuel cell 100. The fuel gas exhaust pipe 230 is an example of a fuel gas discharge portion of the present invention. The fuel gas recirculation pipe 240 is connected to the fuel gas exhaust pipe 230 and the fuel gas supply pipe 220. The fuel gas recirculation pipe 240 is an example of a recirculation portion of the present invention. The vapor-liquid separator 280 is provided between the fuel gas exhaust pipe 230 and the fuel gas recirculation pipe 240. The exhaust fuel gas contains hydrogen that is not consumed, impurities such as nitrogen moved through the fuel cell 100, and water. The vapor-liquid separator 280 separates water from gas (hydrogen and impurities such as nitrogen) in the exhaust fuel gas. In addition, the hydrogen pump 290 is provided in the fuel gas recirculation pipe 240. The fuel cell system uses the hydrogen in the exhaust fuel gas for power generation by supplying the exhaust fuel gas to the fuel cell 100 using the fuel gas recirculation pipe 240 and the hydrogen pump 290.

The oxidizing gas supply circuit 300 includes an air cleaner 310, an air compressor 320 (also called a "pump 320"), an oxidizing gas supply pipe 330 (also called an "oxidizing gas supply portion 330"), a flow dividing valve 340, an atmospheric pressure sensor 350, an outside air temperature sensor 360, an air flow meter 370, a supply gas temperature sensor 380, and a supply gas pressure sensor 390. The fuel cell 100 of this embodiment uses air (oxygen in the air) as an oxidizing gas. The air cleaner 310 removes dust in the air when receiving the air. The pump 320 compresses the air and sends the air to the fuel cell 100 through the oxidizing gas supply pipe 330. The flow dividing valve 340 is connected to an oxidizing gas bypass pipe 450 and divides the air to flow into the fuel cell 100 and the oxidizing gas bypass pipe 450. The atmospheric pressure sensor 350 measures atmospheric pressure. The outside air temperature sensor 360 acquires the temperature of the air before the air is received. The air flow meter 370 measures the flow rate of the received air. The flow rate is substantially the same as the amount of the air supplied to the fuel cell 100. In addition, the flow rate of the air is changed by the rotational speed of the pump 320. The supply gas temperature sensor 380 measures the temperature of the air supplied to the fuel cell 100, and the supply gas pressure sensor 390 measures the pressure of the air supplied to the fuel cell 100.

The exhaust gas circuit 400 includes an exhaust gas pipe 410, a pressure regulating valve 420, a fuel gas discharge pipe 430, an exhaust and drainage valve 440, the oxidizing gas bypass pipe 450, and a silencer 470. The exhaust gas pipe 410 discharges exhaust oxidizing gas of the fuel cell 100. The pressure regulating valve 420 is provided in the exhaust gas pipe 410. The pressure regulating valve 420 regulates the pressure of the air in the fuel cell 100. The fuel gas discharge pipe 430 allows the vapor-liquid separator 280 to be connected to the exhaust gas pipe 410. The exhaust and drainage valve 440 is provided on the fuel gas discharge pipe 430. The control unit 110 (FIG. 1) opens the exhaust and drainage valve 440 to discharge water and gas when the concentration of nitrogen in the exhaust fuel gas is high or when the amount of water in the vapor-liquid separator 280 is high. The gas contains impurities such as nitrogen, and hydrogen. In this embodiment, the fuel gas discharge pipe 430 is connected to the exhaust gas pipe 410, and hydrogen in the discharged gas is diluted with the exhaust oxidizing gas. The oxidizing gas bypass pipe 450 allows the oxidizing gas supply pipe 330 to be connected to the exhaust gas pipe 410. At a connection portion of the oxidizing gas bypass pipe 450 and the oxidizing gas supply pipe 330, the flow dividing valve 340 is provided. In a case where the exhaust and drainage valve 440 is opened to discharge water and gas (primarily nitrogen), the control unit 110 (FIG. 1) opens the flow dividing valve 340 to allow the air to flow through the oxidizing gas bypass pipe 450 and dilute hydrogen. In addition, in a case where gas containing hydrogen is discharged, the control unit 110 opens the flow dividing valve 340 to allow the air to flow through the oxidizing gas bypass pipe 450 and dilute the hydrogen. The silencer 470 is provided downstream of the exhaust gas pipe 410 and reduces exhaust sound. The exhaust gas pipe 410 is an example of an oxidizing gas discharge portion and an exhaust portion of the present invention.

The cooling circuit 500 includes a cooling water supply pipe 510, a cooling water discharge pipe 515, a radiator pipe 520, a water pump 525, a radiator 530, a bypass pipe 540, and a three-way valve 545. The cooling water supply pipe 510 is a pipe for supplying cooling water to the fuel cell 100, and the water pump 525 is provided in the cooling water supply pipe 510. The cooling water discharge pipe 515 is a pipe for discharging the cooling water from the fuel cell 100. The downstream portion of the cooling water discharge pipe 515 is connected to the radiator pipe 520 and the bypass pipe 540 via the three-way valve 545. The radiator 530 is provided in the radiator pipe 520. A radiator fan 535 is provided for the radiator 530. The radiator fan 535 blows a stream of air toward the radiator 530 to accelerate the dissipation of heat from the radiator 530. The downstream portion of the radiator pipe 520 and the downstream portion of the bypass pipe 540 are connected to the cooling water supply pipe 510.

Figure 3:
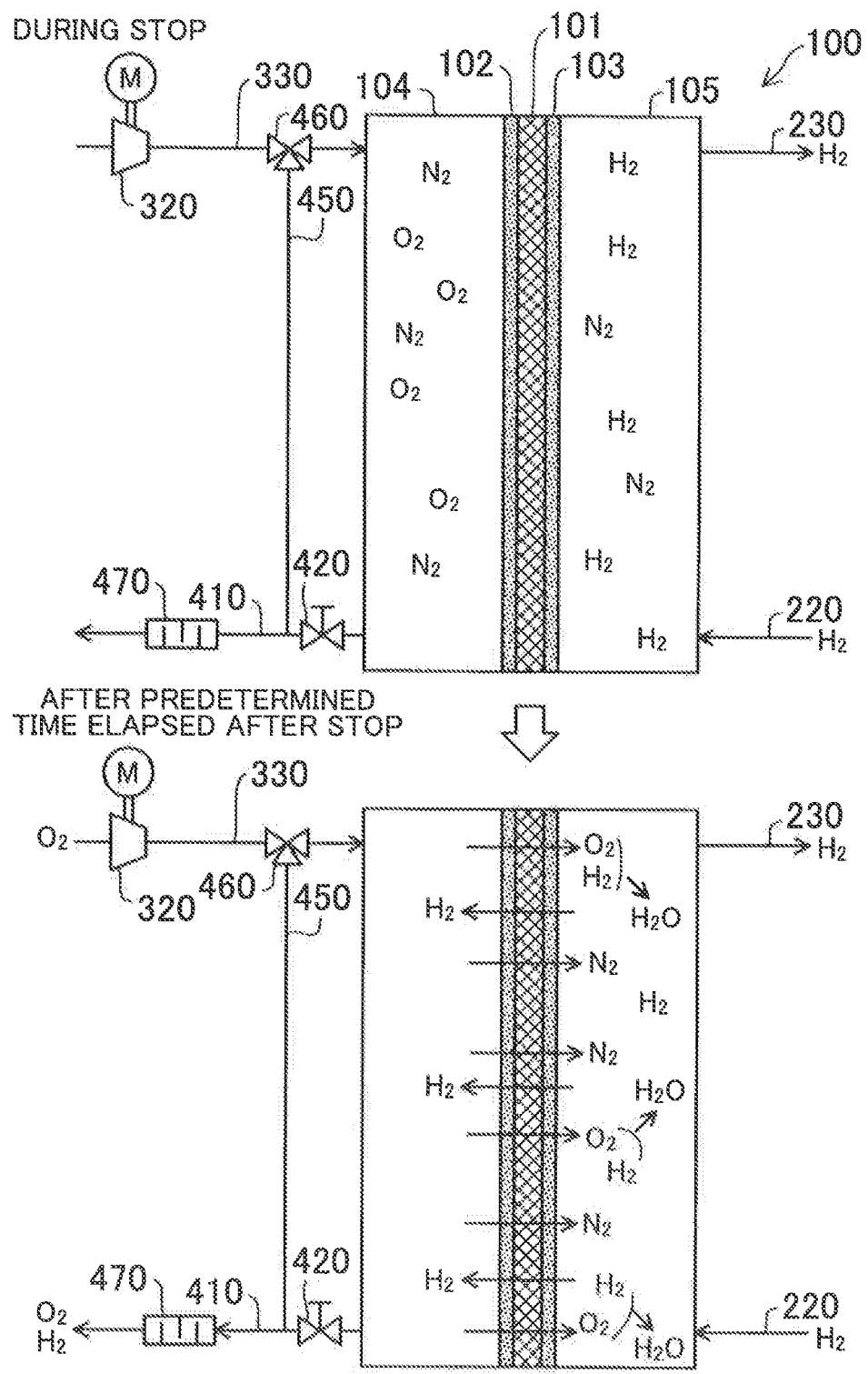
FIG. 3 is an explanatory view schematically illustrating the fuel cell.

FIG. 3 is an explanatory view schematically illustrating the fuel cell. The fuel cell 100 includes an electrolyte film 101, a cathode side catalyst layer 102, an anode side catalyst layer 103, a cathode side gas flow passage 104, and an anode side gas flow passage 105. The cathode side catalyst layer 102 and the cathode side gas flow passage 104 are collectively called a cathode electrode, and the anode side catalyst layer 103 and the anode side gas flow passage 105 are collectively called an anode electrode. The electrolyte film 101 is an electrolyte film having proton conductivity, and for example, a fluorine-based electrolyte resin (ion-exchange resin) such as a perfluorocarbon sulfonic acid polymer is used. The cathode side catalyst layer 102 and the anode side catalyst layer 103 contain carbon that holds a catalyst (for example, platinum). The cathode side gas flow passage 104 is a flow passage through which air is supplied to the cathode side catalyst layer 102, and includes a gas diffusion layer formed of carbon paper and a porous member such as expanded metal. The anode side gas flow passage 105 is a flow passage through which hydrogen is supplied to the anode side catalyst layer 103, and includes a gas diffusion layer formed of carbon paper and a serpentine-shaped flow passage formed by a separator (not illustrated).

The upper side of FIG. 3 illustrates a state immediately after the fuel cell 100 is stopped. When the starter switch 115 of the vehicle 10 equipped with a fuel cell is turned off and the operations of the vehicle 10 equipped with a fuel cell and the fuel cell system thereof are ended, the main stop valve 250 and the regulator 260 of the fuel gas supply circuit 200 (FIG. 2) are closed and thus the hydrogen pump 290 is also stopped. As a result, hydrogen is not supplied to the anode electrode of the fuel cell 100. However, unreacted hydrogen remains therein. In this embodiment, air is used as the oxidizing gas of the fuel cell 100. Therefore, nitrogen in the air supplied to the cathode electrode moves to the anode electrode through the electrolyte film 101 during the operation of the fuel cell 100. Accordingly, nitrogen in addition to hydrogen is contained in the anode electrode. When the partial pressure of nitrogen is high, a portion of the nitrogen is discharged by opening the exhaust and drainage valve 440. On the other hand, the air (primarily oxygen and nitrogen) remains in the cathode electrode.

The lower side of FIG. 3 illustrates a state after a predetermined time (for example, one week to two weeks) has elapsed after the fuel cell 100 is stopped. The hydrogen that remains on the anode electrode side is diffused toward the cathode electrode side, and the oxygen or nitrogen that remains on the cathode electrode side is diffused toward the anode electrode side. Since carbon that holds the catalyst is present in the anode electrode or the cathode electrode, the following two reactions occur in the same surface.

$$H_2 \rightarrow 2H^+ + 2e^- \tag{1}$$

$$(½)O_2 + 2H^+ + 2e^- \rightarrow H_2O \tag{2}$$

Therefore, in order to suppress these reactions, it is preferable that the amount of hydrogen remaining in the anode electrode or oxygen remaining in the cathode electrode is reduced. Here, when the amount of the hydrogen remaining in the anode electrode is reduced, there is concern that the anode side catalyst layer 103 may be deteriorated. Therefore, a certain amount of hydrogen is allowed to remain in the anode electrode to consume the oxygen remaining in the cathode electrode. When the oxygen is consumed, there is an advantage that the oxidation of the catalyst in the cathode side catalyst layer 102 is suppressed. Here, the hydrogen remaining in the anode electrode is easily diffused toward the cathode electrode. Therefore, when the partial pressure of the hydrogen remaining in the anode electrode is increased too much, the amount of the hydrogen diffused toward the cathode electrode is increased. As a result, the concentration of hydrogen discharged from the cathode electrode is increased too much at the time of a subsequent start-up of the fuel cell 100. In this case, the rotational speed of the air compressor 320 is increased to dilute the hydrogen, which is disadvantageous in terms of fuel efficiency, or noise and vibration.

FIG. 4 is a flowchart of a process after the starter switch 115 of the vehicle 10 equipped with a fuel cell is turned off. When the control unit 110 detects that the starter switch 115 is turned off in Step S100, the control unit 110 transitions the process to Step S110. In Step S110, the control unit 110 closes the fuel cell 100 side of the flow dividing valve 340, and closes the pressure regulating valve 420. Accordingly, air is not supplied to the fuel cell 100. In addition, since a valve of the flow dividing valve 340 on the oxidizing gas bypass pipe 450 side is not closed, the air flows toward the oxidizing gas bypass pipe 450.

In Step S120, the control unit 110 draws current from the fuel cell 100 such that the fuel cell 100 generates power. Accordingly, the amount of the oxygen remaining in the cathode electrode of the fuel cell 100 is reduced. In Step S130, the control unit 110 determines whether or not the voltage of the fuel cell 100 is lower than a predetermined voltage V1 (for example, 0.6 V/cell). When the voltage of the fuel cell 100 becomes lower than V1, the control unit 110 may determine that the oxygen in the cathode electrode is sufficiently consumed and transitions the process to Step S140. When the oxygen in the cathode electrode is consumed, the total pressure of the cathode electrode is reduced.

In Step S140, the control unit 110 supplies hydrogen to increase the pressure (total pressure) of the anode electrode to a predetermined first pressure P1 (for example, 160 kPa). Subsequently, in Step S150, the control unit 110 opens the exhaust and drainage valve 440 and performs an exhaust process to reduce the pressure (total pressure) of the anode electrode to a predetermined second pressure P2 (for example, 120 kPa). Accordingly, the hydrogen and impurities (primarily nitrogen) of the anode electrode are discharged. In addition, it is preferable that the second pressure (the internal pressure of the fuel cell 100) is higher than atmospheric pressure. When a time during which the exhaust and drainage valve 440 is opened in Step S150 is long, the partial pressure of hydrogen in the outside atmosphere and the partial pressure of hydrogen in the anode electrode become in equilibrium. However, when the discharge is performed for a short period of time, the hydrogen and impurities (primarily nitrogen) are discharged at the same ratio as the ratio of the partial pressures of the hydrogen and impurities (primarily nitrogen) in the anode electrode. In addition, the pressure of the anode electrode cannot be equal to or lower than atmospheric pressure, and it takes time to allow the pressure of the anode electrode to be equal to atmospheric pressure. Therefore, as described above, the partial pressure of hydrogen in the outside atmosphere and the partial pressure of hydrogen in the anode electrode become in equilibrium, and instead, the partial pressure of hydrogen is reduced.

In Step S160, the control unit 110 supplies hydrogen to increase the pressure (total pressure) of the anode electrode to a predetermined third pressure P3 (for example, 150 kPa). In the process of Step S160, the partial pressure of the impurities in the anode electrode is not changed, while the partial pressure of hydrogen is increased. In Step S170, the control unit 110 determines whether or not the partial pressure of hydrogen reaches a predetermined fourth pressure P4 (for example, 90 kPa) or higher. The partial pressure of hydrogen may be calculated by using the partial pressure of hydrogen in the anode electrode when the starter switch 115 is turned off, the partial pressure of the impurities, and the input and output of the hydrogen in the subsequent Steps S140, S150, and S160, which are calculated by using a change in the total pressure. The control unit 110 may also set the partial pressure of hydrogen in the anode electrode to zero when the starter switch 115 is turned off. In this case, the total pressure of the anode electrode is the partial pressure of the impurities. In addition, the control unit 110 may also set the partial pressure of the impurities in the anode electrode to the partial pressure of nitrogen in the outside atmosphere. In this case, a pressure obtained by subtracting the partial pressure of nitrogen (about 80 kPa) in the outside atmosphere from the total pressure of the anode electrode is the partial pressure of hydrogen. When the partial pressure of hydrogen in Step S170 reaches the fourth pressure P4 or higher, the control unit 110 transitions the process of Step S180, stops the main stop valve 250 and the regulator 260, and stops the pump 320. It is preferable that the first to fourth pressures P1 to P4 satisfy the following two relationships.

P1>P3>P2>>P4

P2>Atmospheric pressure

In addition, the magnitude of the fourth pressure P4 varies depending on the permeability of the hydrogen through the electrolyte film 101 of the fuel cell 100 and time taken until a subsequent restarting operation is performed.

FIG. 5 is an explanatory view illustrating an example of changes in the total pressure and the partial pressure of hydrogen in the anode electrode. In this embodiment, when the voltage of the fuel cell 100 becomes lower than V1 in Step S130 in FIG. 4, the oxygen in the oxidizing gas is consumed and thus most of the oxidizing gas is nitrogen. In this state, the total pressure of the cathode electrode≈the partial pressure of nitrogen in the cathode electrode≈the partial pressure of nitrogen in the outside atmosphere is satisfied, and the partial pressures of nitrogen in the cathode electrode and nitrogen in the anode electrode are in equilibrium. The partial pressure of impurities (primarily nitrogen) in the anode electrode is about 80 kPa, which is substantially the same as the partial pressure of nitrogen in the outside atmosphere. The partial pressure of hydrogen varies depending on the states of the fuel cell 100 so far operated, and can be calculated by measuring the total pressure. In FIG. 5, as an example, the measurement result of the total pressure is 100 kPa in the description. The partial pressure of hydrogen is 20 kPa. In Step S140, hydrogen is supplied and the total pressure becomes 160 kPa (P1). At this time, the partial pressure of impurities is not changed, while the partial pressure of hydrogen is increased. In the example, the partial pressure of hydrogen and the partial pressure of impurities are each 80 kPa. In Step S150, the impurities and hydrogen are discharged such that the total pressure becomes 120 kPa (P2). At this time, the ratio of the partial pressure of hydrogen and the partial pressure of impurities after the discharge is a ratio of (1:1) which is the same as the ratio of the partial pressure of hydrogen and the partial pressure of impurities before the discharge. The partial pressure of hydrogen and the partial pressure of impurities after the discharge are each 60 kPa. In Step S160, hydrogen is supplied, and the total pressure becomes 150 kPa (P3). The partial pressure of impurities is not changed, while only the partial pressure of hydrogen is increased by 30 kPa. Accordingly, the partial pressure of hydrogen in the anode electrode can be 90 kPa (P4).

As time elapses, hydrogen that remains in the anode electrode is diffused toward the cathode electrode as described with reference to FIG. 3. Here, when the partial pressure of hydrogen in the anode electrode is the fourth pressure P4 or higher, even in a case where the fuel cell 100 is not started up for approximately two weeks, the partial pressure of hydrogen can be maintained in a degree in which the catalyst layer of the anode side catalyst layer 103 is not deteriorated. When the partial pressure of hydrogen in the anode electrode is a partial pressure that is significantly higher than the fourth pressure P4, the amount of hydrogen being diffused toward the cathode electrode is increased too much, and the concentration of hydrogen becomes too high in a case where hydrogen is discharged from the cathode electrode at the time of the restart of the fuel cell 100. Therefore, the hydrogen is diluted by increasing the rotational speed of the pump 320. As in this embodiment, as long as the partial pressure of hydrogen is higher than the fourth pressure P4, the amount of hydrogen being diffused toward the cathode electrode is not high, and may not be diluted.

As described above, according to this embodiment, when the starter switch 115 of the vehicle 10 equipped with a fuel cell is turned off, the control unit 110 opens the exhaust and drainage valve 440 to discharge the exhaust gas from the anode electrode of the fuel cell 100 (Step S150), and increases the pressure of hydrogen supplied to the fuel cell 100 to increase the partial pressure of hydrogen in the fuel cell 100 (Step S160), thereby decreasing the partial pressure of impurities such as nitrogen and increasing the partial pressure of hydrogen without increasing the total pressure of the anode electrode. In addition, in this embodiment, specific values of the first to fourth pressures P1 to P4 are examples.

In addition, since the control unit 110 repeats Steps S150 and S160 until the partial pressure of hydrogen reaches the predetermined fourth pressure P4, the partial pressure of hydrogen in the anode electrode can be increased to the predetermined fourth pressure P4.

The control unit 110 does not supply air before Steps S150 and S160 (Step S110) and allows the oxygen in the fuel cell 100 to be consumed by drawing current from the fuel cell 100 (Step S120), thereby suppressing the oxidation of the cathode side catalyst layer 102. In addition, the amount of oxygen being diffused toward the anode electrode is small, and thus the generation of an electromotive force in an electrode surface of the anode electrode can be suppressed.

In addition, in this embodiment, the control unit 110 allows the air to flow through the oxidizing gas bypass pipe 450 in a case where Step S150 is executed, such that hydrogen in the discharged gas can be diluted.

The control unit 110 prevents the air from flowing backward from the exhaust gas pipe 410 and being supplied to the fuel cell 100, by closing the pressure regulating valve 420, in Step S110. However, the control unit 110 may not close the pressure regulating valve 420 but draws current from the fuel cell 100 in Step S120 to allow the fuel cell 100 to generate power.

While the embodiments of the present invention have been described on the basis of several examples, the above-described embodiments of the present invention are intended to facilitate the understanding of the present invention and do not limit the present invention. The present invention can be changed and modified without departing from the spirit of the inventions and the claims, and naturally, the equivalents thereof are included in the present invention.

What is claimed is:

1. A fuel cell system used in a vehicle equipped with a fuel cell comprising:
   a fuel cell;
   a fuel gas supply portion which supplies a fuel gas to the fuel cell;
   a fuel gas discharge portion which discharges exhaust fuel gas from the fuel cell; and
   a control unit,
   wherein, when an operation of the fuel cell is ended, the control unit is configured to perform
   (a) an exhaust process of discharging the exhaust fuel gas of the fuel cell to reduce a pressure in the fuel cell, and
   (b) a process of increasing a partial pressure of the fuel gas in the fuel cell by supplying the fuel gas to the fuel cell after the exhaust process; and
   wherein the control unit is configured to calculate the partial pressure of the fuel gas in the fuel cell, and repeat the processes (a) and (b) until the partial pressure of the fuel gas becomes a predetermined partial pressure or higher.

2. The fuel cell system according to claim 1,
   wherein an internal pressure of the fuel cell after the process (a) is performed is higher than an atmospheric pressure.

3. The fuel cell system according to claim 1, further comprising:
   an oxidizing gas supply portion which supplies an oxidizing gas to the fuel cell;
   an oxidizing gas discharge portion which discharges exhaust oxidizing gas of the fuel cell;
   a bypass pipe which does not supply the oxidizing gas to the fuel cell and discharges the oxidizing gas to the oxidizing gas discharge portion;
   a flow dividing valve for dividing the oxidizing gas to flow into the fuel cell and the bypass pipe; and
   a pressure regulating valve which is provided between a connection portion of the oxidizing gas discharge portion and the bypass pipe, and the fuel cell,
   wherein the control unit is configured to perform, before the process (a), (c) a process of closing the pressure regulating valve, and allowing the oxidizing gas not to be supplied to the fuel cell by using the flow dividing valve and allowing current to flow from the fuel cell, thereby consuming the oxidizing gas in the fuel cell.

4. The fuel cell system according to claim 3,
   wherein the control unit is configured to perform the process (c) until a voltage of the fuel cell becomes less than a predetermined voltage.

5. The fuel cell system according to claim 1, further comprising:
   an oxidizing gas supply portion which supplies an oxidizing gas to the fuel cell;
   an oxidizing gas discharge portion which discharges exhaust oxidizing gas of the fuel cell;
   a bypass pipe which does not supply the oxidizing gas to the fuel cell and discharges the oxidizing gas to the oxidizing gas discharge portion; and
   a flow dividing valve for dividing the oxidizing gas to flow into the fuel cell and the bypass pipe,
   wherein the fuel gas discharge portion and the oxidizing gas discharge portion are connected to each other, and the control unit is configured to control the flow dividing valve to allow all of the oxidizing gas to flow through the bypass pipe when the process (a) is performed, thereby allowing the discharged fuel gas to be diluted and discharged to the outside atmosphere.

6. The fuel cell system of claim 1, wherein the predetermined partial pressure is less than atmospheric pressure.

7. The fuel cell system of claim 1, wherein,
when an operation of the fuel cell is ended, the total pressure in the fuel cell is a first pressure, and
the total pressure in the fuel cell after completing the process (b) is a second pressure that is less than the first pressure.

8. A vehicle equipped with a fuel cell comprising:
the fuel cell system according to claim 1.

9. A fuel cell system used in a vehicle equipped with a fuel cell comprising:
a fuel cell;
a fuel gas supply portion which supplies a fuel gas to the fuel cell;
a fuel gas discharge portion which discharges exhaust fuel gas from the fuel cell; and
a control unit,
wherein, when an operation of the fuel cell is ended, the control unit is configured to perform
(a) an exhaust process of discharging the exhaust fuel gas of the fuel cell to reduce a pressure in the fuel cell, and
(b) a process of increasing a partial pressure of the fuel gas in the fuel cell by supplying the fuel gas to the fuel cell after the exhaust process; and
wherein the control unit is configured to calculate the partial pressure of the fuel gas in the fuel cell, and repeat the processes (a) and (b) until the partial pressure of the fuel gas ranges from about 60 kPa to about 90 kPa.

* * * * *